US009061554B2

(12) United States Patent
Kosugi

(10) Patent No.: US 9,061,554 B2
(45) Date of Patent: Jun. 23, 2015

(54) TIRE POSITION DETERMINATION SYSTEM

(71) Applicant: KABUSHIKI KAISHA TOKAI RIKA DENKI SEISAKUSHO, Aichi (JP)

(72) Inventor: Masanori Kosugi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 100 days.

(21) Appl. No.: 14/030,550

(22) Filed: Sep. 18, 2013

(65) Prior Publication Data

US 2014/0085068 A1    Mar. 27, 2014

(30) Foreign Application Priority Data

Sep. 25, 2012  (JP) ................................. 2012-211048
Dec. 27, 2012  (JP) ................................. 2012-286283

(51) Int. Cl.
*B60C 23/00*    (2006.01)
*B60C 23/04*    (2006.01)

(52) U.S. Cl.
CPC ......... *B60C 23/0489* (2013.01); *B60C 23/0415* (2013.01); *B60C 23/0416* (2013.01); *B60C 23/0488* (2013.01)

(58) Field of Classification Search
CPC ............ B60C 23/0416; B60C 23/0488; B60C 23/0489; B60C 23/0408; B60C 23/0415; B60C 23/064; B60C 23/0471; B60C 23/0486; B60C 23/06; B60T 2240/03; B60T 2240/04; B60T 8/1725; B60T 13/563; B60T 2210/10
USPC ................. 340/447, 443, 440, 442, 445, 438, 340/539.26, 454, 467, 539.1
See application file for complete search history.

(56) References Cited

U.S. PATENT DOCUMENTS

| 4,574,267 | A  | * | 3/1986 | Jones ........................... 340/443 |
| 6,518,877 | B1 | * | 2/2003 | Starkey et al. ................ 340/447 |
| 2001/0008083 | A1 | * | 7/2001 | Brown ............................ 73/146 |
| 2007/0186634 | A1 | * | 8/2007 | Burghardt et al. .............. 73/146 |

(Continued)

FOREIGN PATENT DOCUMENTS

| DE | 10 2011 004 561 | 8/2012 |
| JP | 2006-062516 | 3/2006 |

(Continued)

OTHER PUBLICATIONS

European Search Report, mail date is Nov. 20, 2013.

*Primary Examiner* — Daniel Previl
(74) *Attorney, Agent, or Firm* — Greenblum & Bernstein, P.L.C.

(57) ABSTRACT

A tire position determination system includes a tire pressure detector coupled to a tire. A tire position determination unit locates the tire pressure detector and determines a mounting position of the tire. A gravitational component force detection unit generates gravitational force information of the tire pressure detector. A characteristic value acquisition unit acquires the angle of the tire pressure detector from the gravitational force information. The characteristic value acquisition unit acquires a first characteristic value of the tire pressure detector when a drive source of the vehicle is stopped and a second characteristic value of the tire pressure detector when the drive source is started. A characteristic value comparator compares the first and characteristic values. An operation control unit determines whether the mounting position of the tire has been changed based on the comparison and controls the tire pressure monitoring unit accordingly.

14 Claims, 8 Drawing Sheets

(56) References Cited

U.S. PATENT DOCUMENTS

2011/0132081 A1 6/2011 Lee et al.
2011/0313623 A1 12/2011 Greer et al.
2013/0079977 A1 3/2013 Greer et al.

FOREIGN PATENT DOCUMENTS

JP 2010-122023 6/2010
JP 2012-126341 7/2012

* cited by examiner

TIRE POSITION DETERMINATION SYSTEM

CROSS-REFERENCE TO RELATED APPLICATIONS

This application is based upon and claims the benefit of priority from prior Japanese Patent Applications No. 2012-211048, filed on Sep. 25, 2012 and No. 2012-286283, filed on Dec. 27, 2012, the entire contents of which are incorporated herein by reference.

BACKGROUND OF THE INVENTION

The present invention relates to a tire position determination system that determines a mounting position of a tire when monitoring air pressure of the tire.

Tire pressure monitoring systems are installed in vehicles to improve safety. One type of a tire pressure monitoring system directly monitors the air pressure of each tire using a tire pressure detector coupled to each tire that transmits a tire pressure signal. The tire pressure signal includes data of the pressure detected by a sensor in the tire pressure detector. The tire pressure signal also includes a tire ID stored in the corresponding tire pressure detector. This allows for the pressure to be recognized and the tire to be located. When the pressure of a tire is low, the driver is informed of the location of the lower pressure tire.

The tire pressure monitoring system includes an automatic locating function that periodically checks the position of each tire so that the tire positions are accurately stored even when the tire positions are changed or a tire is exchanged. To implement the automatic locating function, an initiator (trigger device) may be arranged in the wheel well for each tire. The initiator transmits a signal to a corresponding tire pressure detector to locate the tire (refer to, for example, Japanese Laid-Open Patent Publication Nos. 2006-062516 and 2012-126341).

The mounting position of a tire is changed when, for example, the ignition switch is off, that is, when the engine is stopped. Thus, when the ignition switch goes on after changing the mounting position of a tire, there is a need to readily determine whether or not the mounting position of the tire has been changed. This may be achieved by, for example, arranging an initiator in each tire well and determining whether or not the mounting position has been changed by checking the response from each initiator. In this case, however, the initiator arranged in each wheel well increases the number of components.

SUMMARY OF THE INVENTION

It is an object of the present invention to provide a tire position determination system that determines whether or not the mounting position of a tire has been changed with a simple structure and within a short period of time.

One aspect of the present invention is a tire position determination system arranged in a vehicle including a direct type tire pressure monitoring unit. The tire position determination system includes a tire pressure detector coupled to a tire. A tire position determination unit locates the tire pressure detector and determines a mounting position of the tire. A gravitational component force detection unit is arranged in the tire pressure detector. The gravitational component force detects gravitational force applied to the tire pressure detector and generates gravitational force information based on the detected gravitational force. A characteristic value acquisition unit acquires a characteristic value corresponding to an angle of the tire pressure detector based on the gravitational force information generated by the gravitational component force detection unit. The characteristic value acquisition unit acquires a first characteristic value of the tire pressure detector when a drive source of the vehicle is stopped. The characteristic value acquisition unit acquires a second characteristic value of the tire pressure detector when the drive source of the vehicle is started. A characteristic value comparator compares the first characteristic value and the second characteristic value. An operation control unit determines whether the mounting position of the tire has been changed based on the comparison of the characteristic value comparator. The operation control unit controls the tire pressure monitoring unit based on the determination.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a diagram showing changes in the position of a tire pressure detector before and after an ignition switch goes ON;

DETAILED DESCRIPTION OF THE INVENTION

First Embodiment

A first embodiment of a tire position determination system will now be described with reference to FIGS. 1 to 4.

Figure 1:
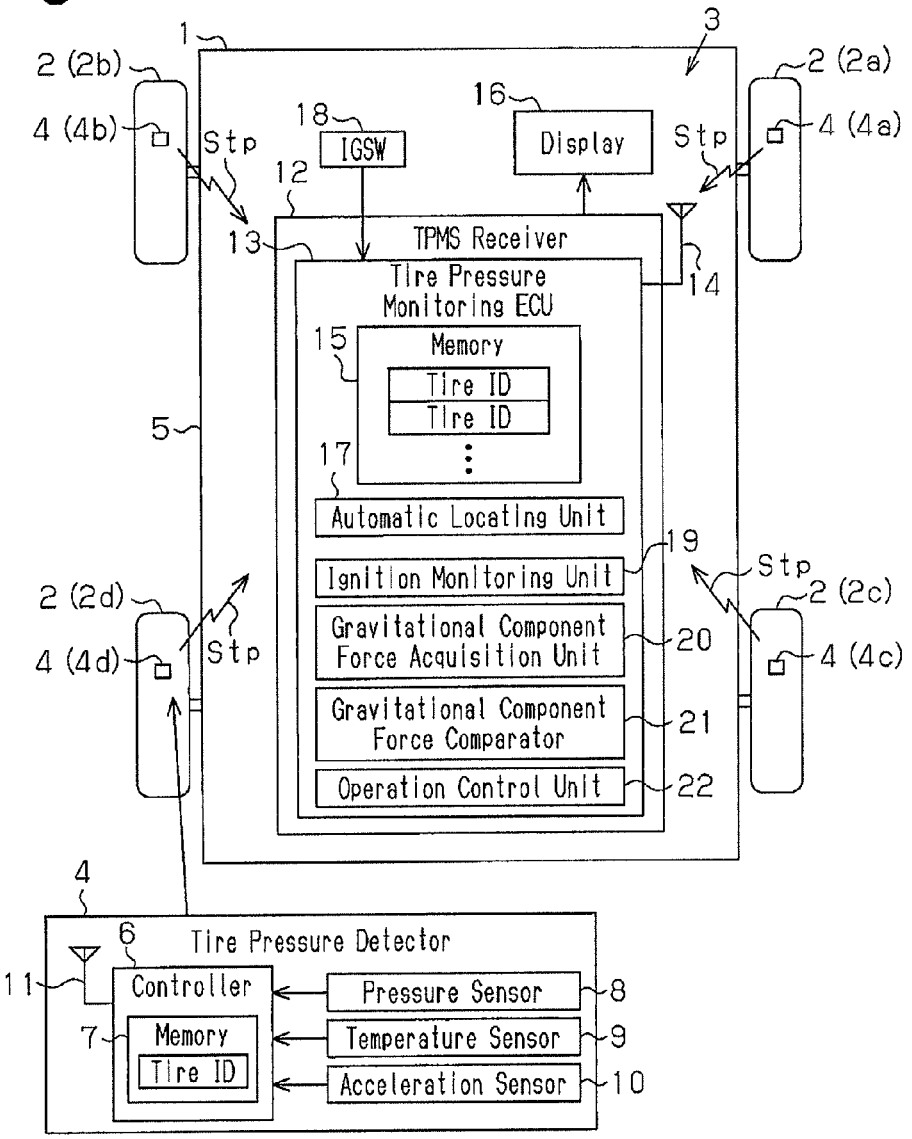
FIG. 1 is a diagram of a tire position determination system in a first embodiment.

Referring to FIG. 1, a vehicle 1 includes tires 2 (2a to 2d) and a tire pressure monitoring system (TPMS) 3 that monitors the air pressure of each tire 2. The tire pressure monitoring system 3 includes a tire pressure detector 4 arranged in each of the tires 2a to 2d. The tire pressure detectors 4 (4a to 4d) are also referred to as tire valves. The tire pressure monitoring system 3 is of a direct type and transmits a tire pressure signal Stp to a vehicle body 5 from each of the tire pressure detectors 4a to 4d to monitor the tire pressure of the tires 2a to 2d at the vehicle body 5. The tire pressure monitoring system 3 corresponds to a tire pressure monitoring unit.

Each tire pressure detector 4 includes a controller 6 that controls the operation of the tire pressure detector 4. The controller 6 includes a memory 7 that stores an ID unique to the corresponding tire 2. Each tire pressure detector 4 includes a pressure sensor 8, which detects the air pressure of the corresponding tire 2, a temperature sensor 9, which detects the temperature of the corresponding tire 2, and an acceleration sensor 10, which detects the acceleration (rotation) of the tire 2. In the tire pressure detector 4, the pressure sensor 8, the temperature sensor 9, and the acceleration sensor 10 are connected to the controller 6. Each controller 6 is connected to a transmission antenna 11 that transmits radio waves on an ultrahigh frequency (UHF).

The vehicle body 5 includes a TPMS receiver 12 that receives the tire pressure signal Stp from each tire pressure detector 4 and monitors the air pressure of each tire 2. The TPMS receiver 12 includes a tire pressure monitoring electronic control unit (ECU) 13, which controls the operation of the TPMS receiver 12, and a reception antenna 14, which receives radio waves on the UHF band. The tire pressure monitoring ECU 13 includes a memory 15 that stores the tire ID of each of the tires 2a to 2d in association with the tire mounting positions (right front, left front, right rear, left rear). The TPMS receiver 12 is connected to a display 16 arranged on, for example, an instrument panel in the passenger compartment.

Figure 2:
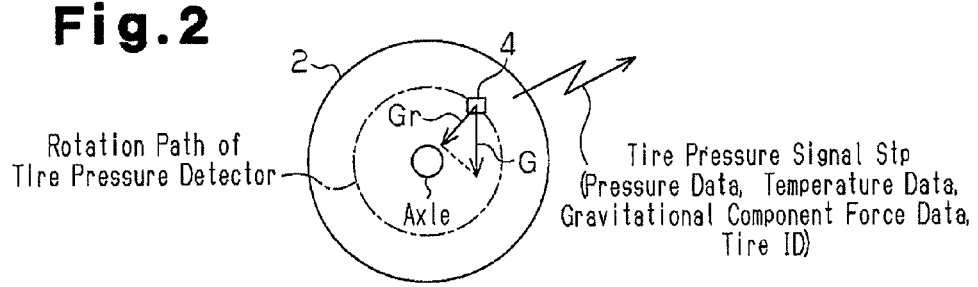
FIG. 2 is a diagram of a tire pressure detector capable of detecting a gravitational component force.

Referring to FIG. 2, the acceleration sensor 10 detects a gravitational component force Gr of the gravitational force G as a gravitational force applied to the tire pressure detector 4. The gravitational component force Gr is directed toward the axle, that is, in a radial direction of the corresponding tire. The tire pressure detector 4 uses the UHF band to transmit the tire pressure signal Stp, which includes pressure data, temperature data, gravitational component force data, and the tire ID. For example, when the corresponding tire 2 rotates, the tire pressure detector transmits the tire pressure signal Stp in constant or irregular intervals to the vehicle body 5. For example, when the tire pressure detector 4 detects that the corresponding tire 2 is not rotating, the tire pressure detector 4 transmits the tire pressure signal Stp in intervals that are longer than or equal to when the tire 2 is rotating. The gravitational component force Gr is one example of a characteristic value (first characteristic value and second characteristic value), and the tire pressure signal Stp that includes the gravitational component force data is one example of gravitational force information.

When the TPMS receiver 12 receives the tire pressure signal Stp from each of the tire pressure detectors 4a to 4d, the TPMS receiver 12 verifies the tire ID in the tire pressure signal Stp. When the tire ID is verified, the TPMS receiver 12 checks the pressure data in the tire pressure signal Stp. If the pressure of the tire 2 is less than or equal to a low pressure threshold, the TPMS receiver 12 shows the tire 2 in association with its mounting position on the display 16. Whenever the TPMS receiver 12 receives the tire pressure signal Stp, the TPMS receiver 12 checks the air pressure of the tire 2 corresponding to the tire pressure signal Stp and monitors the air pressure of each of the tires 2a to 2d.

As shown in FIG. 1, the tire pressure monitoring ECU 13 includes an automatic locating unit 17 that locates each of the tires 2a to 2d. The automatic locating unit 17 may locate the tires 2a to 2d through any process. However, when the tire pressure detector 4 includes the acceleration sensor 10 that detects the gravitational component force Gr, it is preferable that the tires 2a to 2d be located through a process that uses the gravitational component force Gr. Japanese Laid-Open Patent Publication No. 2011-209509 specifically describes an example of such a process for locating a tire.

The automatic locating unit 17 is provided with a tire position change detection function (tire rotation detection function) that determines whether or not the mounting positions of the tires 2 has been changed before and after the an ignition switch 18 goes on. Tire rotation for changing the mounting positions of the tires 2 may be performed when the ignition switch 18 is OFF and the engine is stopped. After the tire rotation is performed, when the ignition switch 18 goes ON again, the mounting positions of the tires 2 have been changed. Thus, the automatic locating unit 17 checks whether or not the mounting positions of the tires 2 have been changed before and after the ignition switch 18 goes ON.

The tire pressure monitoring ECU 13 includes an ignition monitoring unit 19, which monitors the ignition switch 18 based on an ignition switch signal provided from the ignition switch 18, and a gravitational component force acquisition unit 20, which acquires the gravitational component force data from the tire pressure signal Stp. When the gravitational component force acquisition unit 20 receives the tire pressure signal Stp from each tire pressure detector 4 with the reception antenna 14, the gravitational component force acquisition unit 20 reads the gravitational component force data from the tire pressure signal Stp and acquires the gravitational component force Gr. The gravitational component force acquisition unit 20 acquires the gravitational component force Gr of each of the tires 2a to 2d when the ignition switch 18 goes ON and goes OFF. The ignition monitoring unit 19 and the gravitational component force acquisition unit 20 form one example of a characteristic value acquisition unit.

The tire pressure monitoring ECU 13 includes a gravitational component force comparator 21 that compares a gravitational component force Gr1, which is detected by each of the tire pressure detectors 4a to 4d when the ignition switch 18 goes OFF, and a gravitational component force Gr2, which is detected by each of the tire pressure detectors 4a to 4d when the ignition switch 18 goes ON. The gravitational component force comparator 21 checks whether or not the gravitational component force Gr has changed before and after the ignition switch goes ON. The gravitational component force comparator 21 is one example of a characteristic value comparator.

The tire pressure monitoring ECU 13 includes an operation control unit 22 that determines whether or not the mounting position of each of the tires 2a to 2d has been changed based on the comparison of the gravitational component force comparator 21 and controls the operation of the tire pressure monitoring system 3. When the gravitational component force Gr of each of the tires 2a to 2d is the same before and after the ignition switch 18 goes ON, the operation control unit 22 determines that the mounting position of each of the tires 2a to 2d has not been changed and shows the tires 2a to 2d at the previous mounting positions on the display 16. If there is a change in the gravitational component force Gr of any one of the four tires 2a to 2d when the ignition switch 18 goes ON, the operation control unit 22 determines that the mounting position of a tire 2 has been changed and shows a message such as "locating tires" on the display 16 or does not show the mounting positions of the tires 2 on the display 16.

The operation of the automatic locating unit 17 will now be described with reference to FIGS. 3 and 4.

Figure 3:
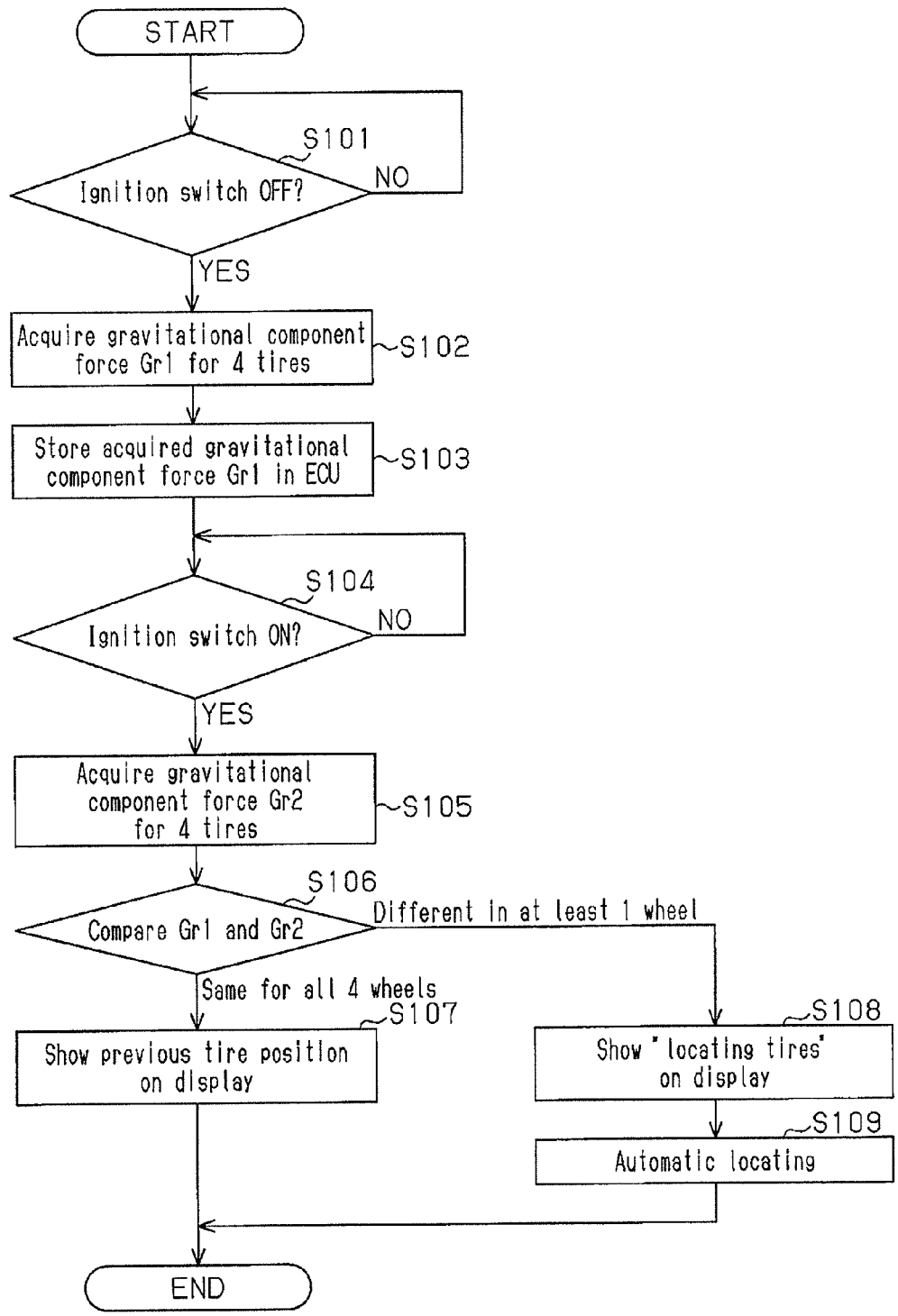
FIG. 3 is a flowchart illustrating the procedures for detecting tire position changes.

Referring to FIG. 3, in step S101, the gravitational component force acquisition unit 20 determines whether or not the ignition switch 18 is OFF from the monitoring result of the ignition monitoring unit 19. That is, the gravitational component force acquisition unit 20 determines whether or not the engine of the vehicle 1 is stopped. If the ignition switch 18 is OFF, the gravitational component force acquisition unit 20 proceeds to step 102. If the ignition switch 18 is not OFF, the gravitational component force acquisition unit 20 waits at step S101 until the ignition switch 18 goes OFF.

In step S102, the gravitational component force acquisition unit 20 acquires the gravitational component force Gr1 of each of the four tires 2a to 2d when the ignition switch 18 is OFF. The tire pressure detectors 4a to 4d each transmit the tire pressure signal Stp at a different timing. When receiving each tire pressure signal Stp, the gravitational component force acquisition unit 20 acquires the gravitational component force Gr1 of the corresponding one of the tire pressure detectors 4a to 4d.

In step S103, the gravitational component force acquisition unit 20 stores the four gravitational component force Gr1 of the four tires 2a to 2d acquired in step S102 in the memory 15 of the tire pressure monitoring ECU 13.

In step S104, the gravitational component force acquisition unit 20 determines whether or not the ignition switch 18 has been switched ON from the monitoring result of the ignition monitoring unit 19. That is, the gravitational component force acquisition unit 20 determines whether or not the ignition switch 18 has been moved from the IG position to the ACC ON position or the IG ON position. If the ignition switch 18 is ON, the gravitational component force acquisition unit 20 proceeds to step 105. If the ignition switch 18 is OFF, the gravitational component force acquisition unit 20 waits at step S104 until the ignition switch 18 goes ON.

In step S105, the gravitational component force acquisition unit 20 acquires the gravitational component force Gr2 of each of the four tires 2a to 2d when the ignition switch 18 is ON. The tire pressure detectors 4a to 4d each transmit the tire pressure signal Stp at a different timing. When receiving each tire pressure signal Stp, the gravitational component force acquisition unit 20 acquires the gravitational component force Gr2 of the corresponding one of the tire pressure detectors 4a to 4d.

In step S106, the gravitational component force comparator 21 compares the gravitational component force Gr1 and the gravitational component force Gr2 for each of the four tires 2a to 2d. If the gravitational component force Gr1 and the gravitational component force Gr2 are the same in all of the four tires 2a to 2d, the gravitational component force comparator 21 proceeds to step S107. If the gravitational component force Gr1 and the gravitational component force Gr2 differs in any one of the four tires 2a to 2d, the gravitational component force comparator 21 proceeds to step S108.

In step S107, when the gravitational component force Gr1 and the gravitational component force Gr2 are the same in all of the four tires 2a to 2d before and after the ignition switch 18 goes ON, the operation control unit 22 shows the previous mounting positions of the tires 2 on the display 16 near the driver seat. That is, the operation control unit 22 operates the automatic locating unit 17 in a normal manner and shows the previous mounting positions of the tires 2 on the display 16. The previous mounting positions are displayed because there are no changes in the mounting positions of the tires 2a to 2d that have been located before the ignition switch 18 goes OFF.

Figure 4:
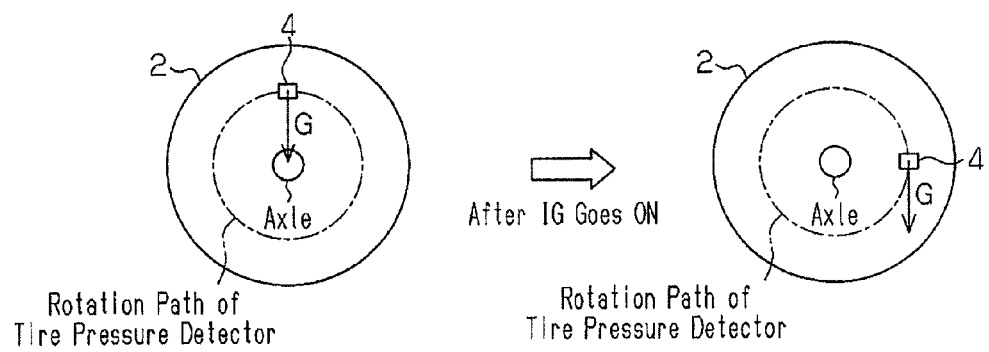

Referring to FIG. 4, after the ignition switch 18 goes OFF, for example, when the four tires 2a to 2d undergo rotation or are exchanged with new ones, the coupled position of each of the tire pressure detectors 4a to 4d is changed in the tire rolling direction before and after the ignition switch 18 goes ON. In this case, the gravitational component force Gr1 differs from the gravitational component force Gr2 in at least one of the four tires 2a to 2d. Thus, the operation control unit 22 proceeds from step S107 to step S108.

In step S108, if the gravitational component force Gr1 differs from the gravitational component force Gr2 in at least one of the four tires 2a to 2d, the operation control unit 22 shows a message such as "locating tires" on the display 16. Instead of showing the message of "locating tires," the display 16 may show none of the tire mounting positions.

In step S109, the operation control unit 22 provides the automatic locating unit 17 with an automatic locating request, and the automatic locating unit 17 performs an automatic locating process. Thus, even when the four tires 2a to 2d undergo rotation or are exchanged with new ones, the correct mounting positions of the tires 2a to 2d are registered again to the tire pressure monitoring ECU 13.

When showing the message "locating tires" on the display 16 in step S108, the previous tire positions may also be shown on the display 16. This allows for a user to recognize that since "locating tires" is shown, the mounting positions of the tires 2 shown on the display 16 are inaccurate.

Further, for example, the vehicle body 5 may intentionally be pushed when the ignition switch 18 is OFF. This would roll the tires 2. Thus, even though the mounting positions of the tires 2 have not been changed, the coupled position of each of the tire pressure detectors 4a to 4d would be changed in the tire rolling direction, and the message "locating tires" would be shown on the display 16. In this case, however, the automatic tire locating performed when "locating tires" is shown would obtain tire mounting positions that conform to the previous tire positions. In this manner, it does not matter that the previous tire positions are shown on the display 16 when "locating tires" is shown.

The gravitational component force Gr of each of the tires 2a to 2d needs to be stored in the memory 15 of the tire pressure monitoring ECU 13 immediately after the ignition switch 18 goes OFF. Here, the phrase "immediately after" means before lifting the vehicle body 5 with a jack or the like to perform rotation on the four tires 2a to 2d. Thus, the gravitational component force Gr may be obtained immediately before the ignition switch 18 goes OFF. In this case, the phrase "immediately before" refers to a period of time from when the gravitational component force Gr is obtained to when the ignition switch 18 goes OFF that is too short for lifting the vehicle body 5 with a jack or the like and performing rotation on the four tires 2a to 2d.

When the ignition switch 18 goes ON, the TPMS receiver 12 obtains the gravitational component force Gr again from each of the tire pressure detectors 4a to 4d. However, the user may start driving the vehicle immediately after turning ON the ignition switch 18. Thus, it is preferable that the gravitational component force Gr be obtained constantly or periodically (in irregular cycles or when radio waves are received for a slight fixed time). This would allow changes in the mounting positions of the tires 2 to be recognized even when the vehicle is immediately driven after the ignition switch 18 goes ON.

The above embodiment has the advantages described below.

(1) Each of the tire pressure detectors 4a to 4d transmits the tire pressure signal Stp, which includes data of the gravitational component force detected by the acceleration sensor 10, to the TPMS receiver 12. The TPMS receiver 12 acquires the gravitational force component Gr1, which is obtained when the ignition switch 18 goes OFF, and the gravitational force component Gr2, which is obtained when the ignition switch 18 goes ON. Then, the TPMS receiver 12 compares the gravitational force component Gr1 with the gravitational force component Gr2 to determine whether or not the mounting positions of the tires 2 has been changed before and after the ignition switch 18 goes ON. When the gravitational force component Gr1 after the ignition switch 18 goes OFF differs from the gravitational force component Gr2 after the ignition switch goes ON in of any one of the four tires 2a to 2d, the TPMS receiver 12 determines that the mounting positions of the tires 2 has been changed, and shows the message "locating tires" on the display 16 or does not show the mounting positions of the tires 2 on the display 16.

When the ignition switch 18 goes OFF and when the ignition 18 then goes ON, the TPMS receiver 12 obtains the gravitational component force Gr from each of the tire pressure detectors 4a to 4d, and checks whether the gravitational component force Gr has changed before and after the ignition switch 18 goes ON to determine whether or not the mounting positions of the tires 2 have been changed. Accordingly, the determination of whether or not the mounting positions of the tires 2 has been changed may be completed during the short period from when the ignition switch 18 goes OFF to when the ignition switch 18 goes ON. Further, changes in the mounting positions of the tires 2 may be determined using the gravitational component forces Gr detected by the tire pressure detectors 4a to 4d. This allows for changes in the mounting positions of the tires 2 to be determined without arranging an initiator or the like in each wheel well. Thus, changes in the mounting positions of the tires 2 are determined with a simple structure.

(2) If the TPMS receiver 12 determines that the mounting positions of the tires 2 have not been changed when the ignition switch 18 goes ON, the TPMS receiver 12 shows the previously obtained mounting positions of the tires 2 on the display 16. Thus, the previous obtained data may be used to show the mounting positions of the tires 2 on the display 16.

(3) If the TPMS receiver 12 determines that the mounting positions of the tires 2 have been changed when the ignition switch 18 goes ON, the display 16 shows the message "locating tires" or shows nothing to notify the driver that the mounting positions of the tires 2 have been changed. Thus, the driver may be notified that the tire mounting positions have changed during the period from when the ignition switch 18 goes OFF to when the ignition switch 18 goes ON.

(4) If the TPMS receiver 12 determines that the tire mounting positions have been changed when the ignition switch 18 goes ON, the locations of the tires are determined again with the tire locating function. Thus, even if the mounting positions of the tires 2 are changed when the ignition switch 18 goes OFF, the tire pressure monitoring ECU may reregister the changed mounting positions of the tires 2.

(5) Even if the TPMS receiver 12 determines that the mounting positions of the tires 2 have not been changed when the ignition switch 18 goes ON, the tire locating function continues to check the tire positions. Thus, even if the tire pressure detectors 4a to 4d of the tires 2a to 2d are located at the same positions before and after the positions of the tires 2a to 2d are changed, the tire pressure monitoring ECU 13 ultimately reregisters the correct mounting positions of the tires 2.

(6) The tire pressure detector 4 may constantly or periodically transmit the gravitational component force Gr when the vehicle 1 is not moving. Thus, during the period in which the ignition switch 18 is OFF, the tire pressure monitoring ECU 13 may collect the gravitational component force Gr from each of the tire pressure detectors 4a to 4d. As a result, even if the user starts driving the vehicle 1 immediately after starting the engine, the determination of changes in the mounting positions of the tires 2 may be completed in advance before the vehicle 1 starts moving.

Second Embodiment

A second embodiment will now be described with reference to FIGS. 5 to 8. The second embodiment differs from the first embodiment in how changes in the tire positions are determined. Like or same reference numerals are given to those components that are the same as the corresponding components of the first embodiment. In the same manner as the first embodiment, the tires are located with the tire locating function when the vehicle 1 is not moving.

Figure 5:
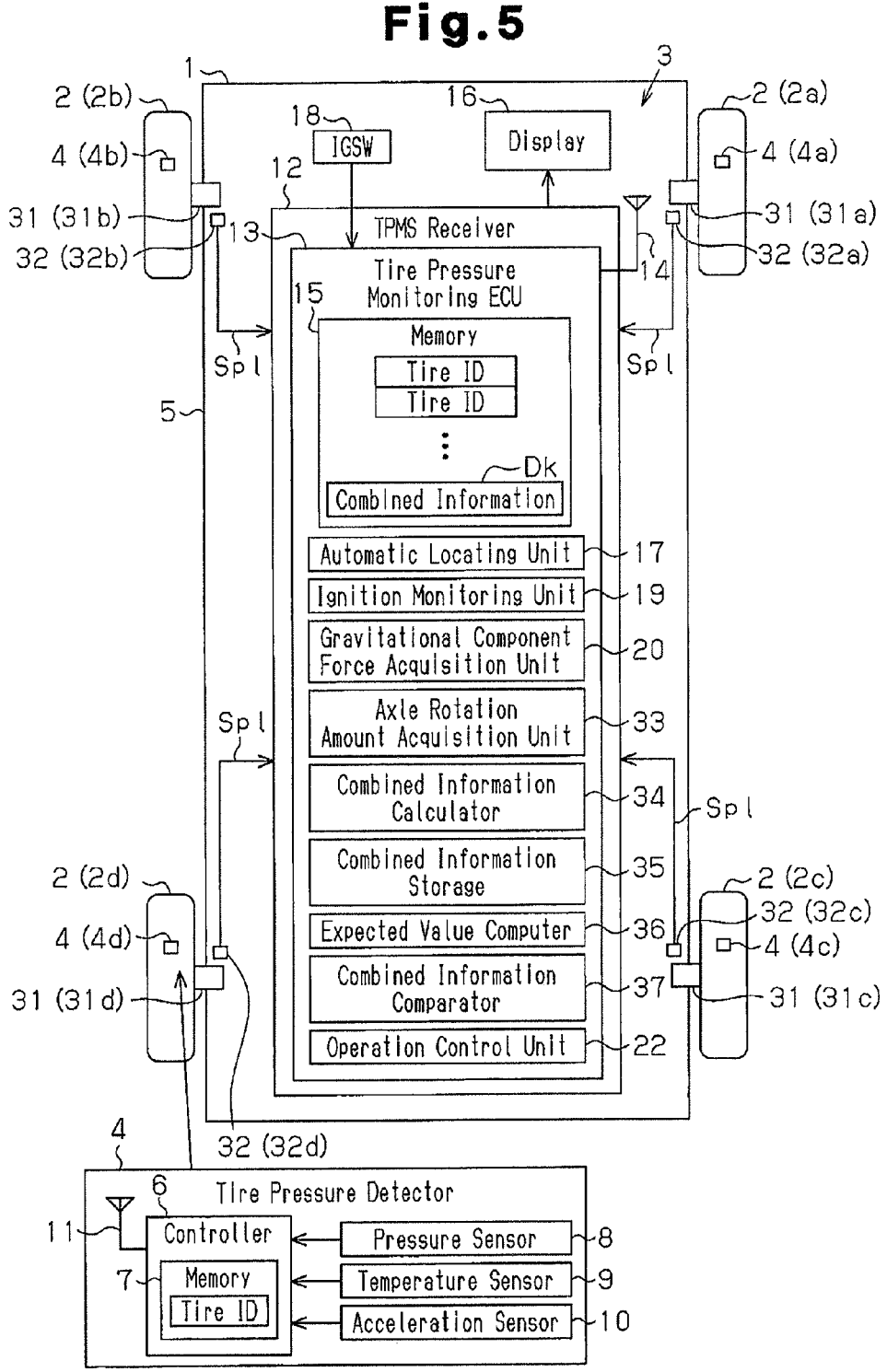
FIG. 5 is a diagram of a tire position determination system in a second embodiment.

Referring to FIG. 5, the vehicle 1 includes an axle rotation amount detectors 32 (32a to 32d) that detect the rotation amount of axles 31 (31a to 31d) of the tires 2a to 2d. Each of the axle rotation amount detects 32a to 32d includes, for example, an antilock brake sensor. For example, each of the axle rotation amount detectors 32a to 32d includes a sensor on the vehicle body 5 to detect a plurality of (e.g., 48) teeth formed on the corresponding one of the axles 31a to 31d. Each of the axle rotation amount detectors 32a to 32d provides the TPMS receiver 12 with a pulse signal Sp1 having a rectangular wave in accordance with the detection of the teeth. Each of the axle rotation amount detectors 32a to 32d detects the rising and falling of pulses for each rotation of the tire to generate the pulse signal Sp1 with, for example, 96 pulses.

The tire pressure monitoring ECU 13 includes an axle rotation amount acquisition unit 33 that acquires the number of pulses in each pulse signal Sp1 provided from the axle rotation amount detectors 32a to 32d corresponding to the axles 31a to 31d. That is, the axle rotation amount acquisition unit 33 acquires the axle rotation amount N for each of the axles 31a to 31d.

The tire pressure monitoring ECU 13 includes a combined information calculator 34 and a combined information storage 35. The combined information calculator acquires combined information Dk (correlation) of the axle rotation amount N and the gravitational component force Gr for each of the tire pressure detectors 4a to 4d. The combined information storage 35 stores, in the memory 15, the combined information Dk obtained immediately before the ignition switch 18 goes OFF for each of the tires 2a to 2d that has undergone tire location (automatic location). For example, the information storage 35 stores the combined information Dk in response to a drive source stop signal immediately before the drive source of the vehicle 1 stops. The combined information calculator 34 obtains the combined information of each of the tire pressure detectors 4a to 4d. The combined information storage 35 continues to store the combined information in the memory 15 even after the ignition switch 18 goes OFF. The tire pressure monitoring ECU 13 includes an expected value computer 36 that computes expected values of the combination of the axle rotation amount N and the gravitational component force Gr when the tires 2a to 2d rotate after the ignition switch 18 goes ON. The tire pressure monitoring ECU 13 includes an information comparator 37 that compares the combined information Dk newly acquired when the vehicle 1 starts to travel again and the combined information Dk stored in the memory 15. The combined information comparator 37 is one example of a characteristic value comparator.

When the vehicle 1 first stops after the ignition switch 18 goes ON, the operation control unit 22 determines the mounting positions of the tires 2 based on the data of the gravitational component force in the tire pressure signal Stp from each of the tire pressure detectors 4a to 4d. For example, the operation control unit 22 checks whether or not the combination of the axle rotation amount N and the gravitational component force Gr acquired from each of the tire pressure detectors 4a to 4d after the ignition switch 18 goes ON conforms to the expected values to determine whether or not the mounting positions of the tires 2 have been changed.

The detection of tire position changes in the second embodiment will now be described with reference to FIGS. 6 to 8. It is assumed here that the tire location has been completed, and the ID of the right front tire that is ID1 has already been obtained.

Figure 6:
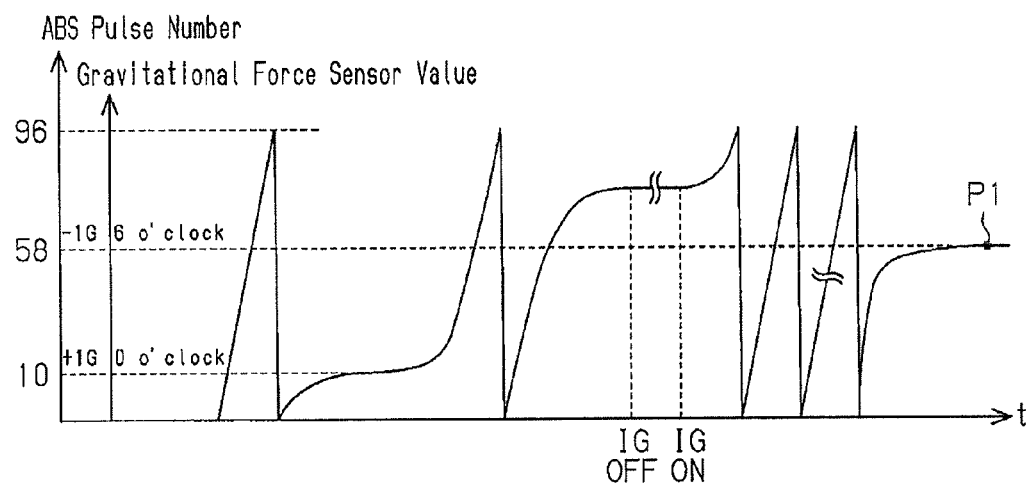
FIG. 6 is a graph showing the axle rotation amount and gravitational component force with respect to time.

Referring to FIG. 6, the combined information calculator 34 periodically acquires the gravitational component force Gr from the right front tire pressure detector 4a. The combined information calculator 34 checks the present axle rotation amount N of the right front axle rotation amount detector 32a and acquires the combined information Dk of the axle rotation amount N and the gravitational component force Gr. The combined information calculator 34 calculates the combined information whenever acquiring the gravitational component force Gr from the right front tire pressure detector 4a.

When the ignition switch 18 goes OFF, the combined information storage 35 stores, in the memory 15, the combined information Dk acquired immediately before the ignition switch 18 goes OFF or the moment the ignition switch 18 goes OFF. Thus, even when the ignition switch 18 subsequently goes OFF, the combined information Dk remains stored in the memory 15.

Figure 7A:
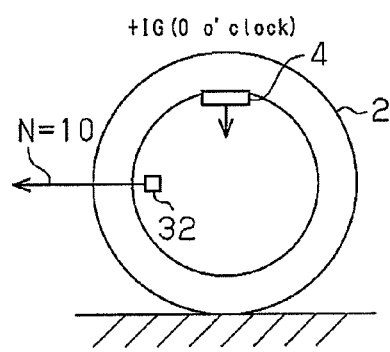
FIGS. 7A and 7B show examples of combinations of the axle rotation amount and the gravitational component force.
Figure 7B:
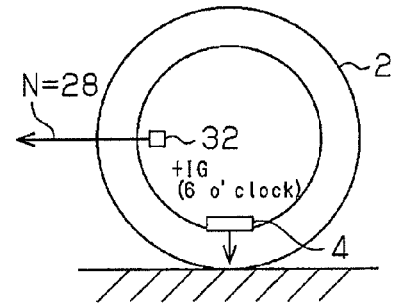

FIGS. 7A and 7B show the correlation of the axle rotation amount N and the gravitational component force Gr. As shown in FIG. 7A, for example, when the tire pressure detector 4 is located at a zero o'clock position of the corresponding tire 2 that is opposite to the portion contacting the road surface, the axle rotation amount N is, for example, "10." In this case, as shown in FIG. 7A, when the tire pressure detector 4 is located at a six o'clock position of the corresponding tire 2 where the tire 2 contacts the road surface, the axle rotation amount N is "58 (10+48)." In this manner, there is a correlation between the axle rotation amount N and the gravitational component force Gr. This correlation is satisfied as long as the mounting position of the tire 2 is not changed.

Referring to FIG. 6, when the vehicle 1 first stops at point P1 after the ignition switch 18 goes ON, for example, the right front tire pressure detector 4a stops at six o'clock position where the tire 2 contacts the road surface, and the tire pressure detector 4a transmits the tire pressure signal Stp, which includes the gravitational component force data, to the vehicle body 5. The gravitational component force acquisition unit 20 determines from the right front tire pressure signal Stp that the gravitational component force Gr is "−1G." Further, the axle rotation amount acquisition unit 33 acquires "58" as the axle rotation amount obtained by the right front axle rotation amount detector 32a.

Based on the combined information Dk stored in the memory 15, the expected value computer 36 computes values that may be expected when the front right tire 2a rotates. Thus, the combined information comparator 37 compares the expected value with the combination of the axle rotation amount N and the gravitational component force Gr acquired at point P1 to determine whether or not the tire position has been changed. Here, when the axle rotation amount N and the gravitational force component Gr at point P1 conform to the expected values, the operation control unit 22 determines that the mounting position of the tire 2 has not been changed. When the axle rotation amount N and the gravitational force component Gr at point P1 differ from the expected values, the operation control unit 22 determines that the mounting position of the tire 2 has been changed.

When the expected values are obtained for all four of the tires 2, the operation control unit 22 determines that the tires 2a to 2d have not been rotated during the period the ignition switch 18 is OFF. Thus, the operation control unit 22 shows the previous tire positions on the display 16 in front of the driver seat. When the expected values are not obtained for any one of the four tires 2, the operation control unit 22 determines that the mounting position of the tire 2 has been changed. Thus, the operation control unit 22 provides the automatic locating unit 17 with an automatic locating request, and the automatic locating unit 17 performs automatic locating.

Figure 8:
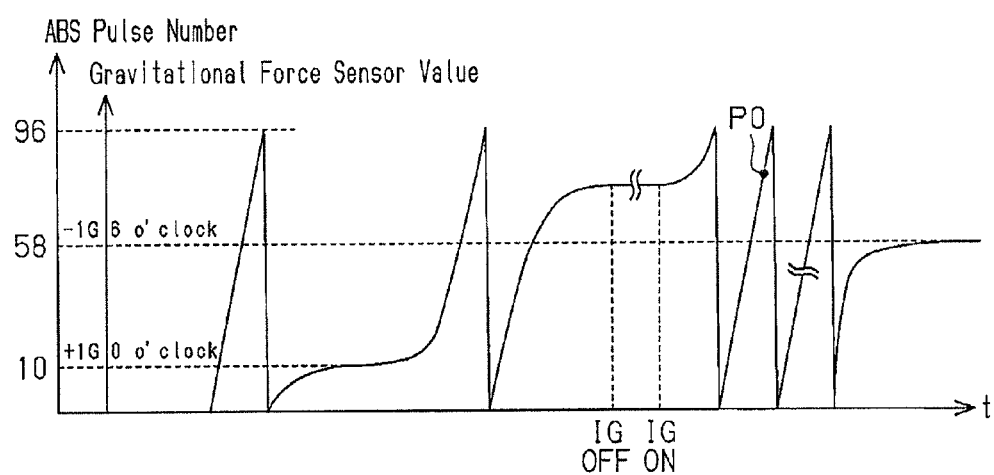
FIG. 8 is a graph showing the axle rotation amount and gravitational component force with respect to time.

FIG. 8 is one example showing how the mounting position of the tire 2 is determined when the ignition switch 18 goes ON and the vehicle 1 starts to move. In this case, the tire pressure detector 4 functions to determine whether or not the vehicle 1 will stop. For example, when the gravitational component force Gr does not change for a certain time or longer (e.g., ten minutes or longer), the tire pressure detector 4 determines that the vehicle 1 is stopped. When determining that the vehicle 1 has first moved after the vehicle 1 was stopped, the tire pressure detector 4 transmits the tire pressure signal Stp that includes the measured gravitational component force Gr. The TPMS receiver 12 uses the gravitational component force Gr in the tire pressure signal Stp to determine whether or not the tire position has been changed.

The determination of whether or not a tire position has been changed is performed when the vehicle 1 is moving. In this case, the tire pressure signal Stp needs to include information indicating that the tire pressure signal Stp is a signal used to check whether or not the tire mounting position has been changed.

In the second embodiment, the combined information Dk is a combination obtained immediately before the ignition switch 18 goes OFF but does not necessarily have to be obtained immediately before the ignition switch 18 goes off.

Under normal circumstances, the pulse signal Sp1 of the axle rotation amount detector 32 and the output of the acceleration sensor 10 may be deviated whenever the vehicle 1 stops. However, when obtained immediately before the ignition switch 18 goes OFF, the accumulation of errors is suppressed. This allows for accurate determinations. However, such errors often result from the accuracy of the acceleration sensor 10.

Thus, the combined information Dk may be determined and calculated from, for example, multiple sets of information obtained immediately before the ignition switch 18 goes OFF. A specific example of such processing is an averaging process that averages multiple values. Another example is a weighting process (fuzzy process) that weights each of the multiple values. The weighting process adds, for example, 50% to the value immediately before the ignition switch 18 goes OFF, 30% to the one before that value, 20% to the one before the value of 30%, and 10% to the next value. This calculates the combined information Dk in which errors have been absorbed.

In addition to advantages (1) to (6) of the first embodiment, the second embodiment has the advantages described above.

(7) When the ignition switch 18 goes OFF, the combined information Dk of the axle rotation amount N and the gravitational component force Gr obtained immediately before the ignition switch 18 goes OFF is stored in the memory 15 and continuously used after the ignition switch 18 goes ON again. After the ignition switch 18 goes ON, the TPMS receiver 12 compares the combined information Dk acquired after the four tires 2a to 2d are rotated with the expected values obtained from the combined information Dk stored in the memory 15 to determine whether or not the tire positions have been changed. When the combined information Dk acquired after the ignition switch 18 goes OFF conforms to the expected values, the TPMS receiver 12 determines that the mounting positions of the tires 2 have not changed. When the combined information Dk acquired after the ignition switch 18 goes ON conforms to the expected values, the TPMS receiver 12 determines that the mounting positions of the tires 2 have been changed. Thus, even if the gravitational component force Gr cannot be transmitted because the vehicle 1 starts to move immediately after the ignition switch 18 goes ON, changes in the mounting positions of the tires 2 may be determined.

(8) After the ignition switch 18 goes ON, the TPMS receiver 12 transmits the gravitational component force Gr to the TPMS receiver 12 from each of the tire pressure detectors 4a to 4d when the vehicle 1 first stops, and determines whether or not the tire positions have been changed with the gravitational component force Gr. This allows for the determination of whether or not the tire positions have been changed to be completed within a short period of time from when the ignition switch 18 goes ON to when the vehicle 1 first stops.

(9) The combined information Dk stored in the memory 15 includes sets of combined information acquired immediately before the ignition switch 18 goes OFF. Thus, although the axle rotation amount N and the gravitational component Gr may be deviated whenever the vehicle 1 is stopped, errors in the combined information Dk stored in the memory 15 may be reduced as long as the combined information Dk is acquired immediately before the ignition switch 18 goes OFF.

(10) The determination of whether or not the tire positions have been changed may be readily completed by transmitting tire position determination radio waves from the tire pressure detectors 4a to 4d when the vehicle 1 first moves after stopping. Thus, after the vehicle 1 starts to move, the driver may readily be informed whether or not the tire positions have been changed.

(11) The combined information Dk stored in the memory 15 may be obtained from values acquired immediately before the ignition switch 18 goes off by performing an averaging process, a weighting process, or the like. In this case, the combined information Dk may be accurately calculated.

Third Embodiment

A third embodiment will now be described with reference to FIGS. 9 to 11. The third embodiment is an improvement of the second embodiment.

Figure 9:
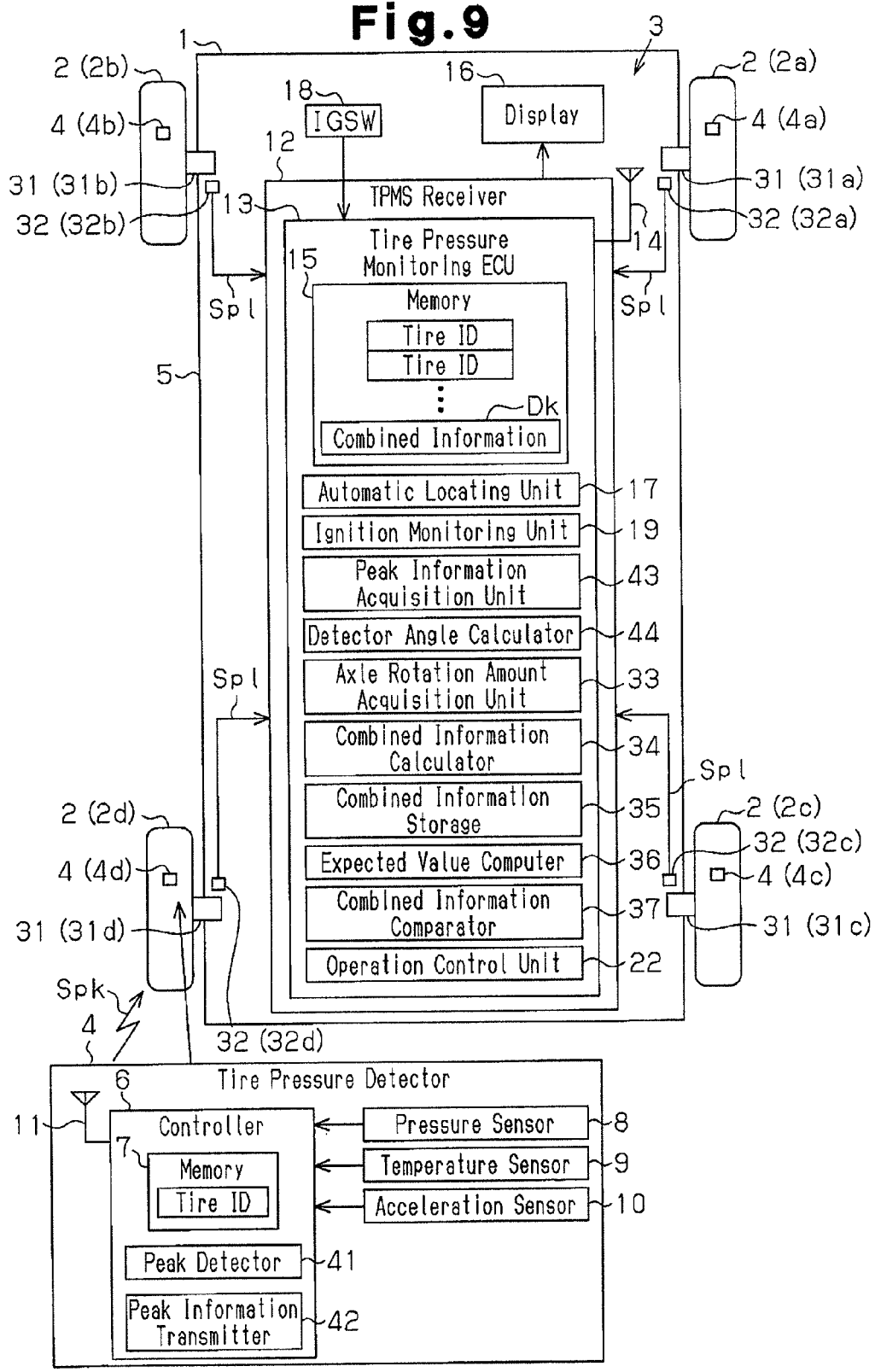
FIG. 9 is a diagram of a tire position determination system in a third embodiment.

Referring to FIG. 9, the controller 6 of each of the tire pressure detectors 4 includes a peak detector 41 and a peak information transmitter 42. The peak detector 41 detects the peak of the gravitational component force Gr indicating that the tire pressure detector 4 is located at a peak in the tire rotating direction. The peak information transmitter 42 notifies the TPMS receiver 12 of the peak information Spk when the gravitational component force Gr reaches the peak. The peak detector 41 detects, for example, the minimum value of the gravitational component force Gr in which the tire pressure detector 4 is located at a 12 o'clock position where the tire 2 comes into contact with the road surface. The peak information Spk is one kind of signal including a tire ID and a command for notification of detection of a gravitational component force Gr including the peak value. For example, when determining that the velocity of the vehicle 1 has become low based on the changing amount of the gravitational component force Gr, the peak information transmitter 42 transmits the peak information Spk. The peak detector 41 and the peak information transmitter 42 form one example of a characteristic acquisition unit, and the peak information Spk is one example of gravitational information.

The tire pressure monitoring ECU 13 includes a peak information acquisition unit 43 that acquires the peak information Spk transmitted from each of the tire pressure detectors 4a to 4d with the TPMS receiver 12. Further, the pressure monitoring ECU 13 includes a detector angle calculator 44 that calculates the detector angle 9k of each of the tire pressure detectors 4a to 4d. The detector angle calculator 44 stores the axle rotation amount Cn (n=1 to 4) of a representative wheel 45 whenever the peak information Spk is received from each of the tire pressure detectors 4a to 4d. After the axle rotation amount Cn is obtained for every one of the wheels, the detector angle 9k is calculated for each of the tire pressure detectors 4a to 4d based on the axle rotation amount Cn of every one of the wheels and the axle rotation amount Cref of the present representative wheel 45. The detector angle 9k is one example of a characteristic value (first characteristic value and second characteristic value), and the peak information acquisition unit 43 and the detector angle calculator 44 form one example of a characteristic value acquisition unit.

Figure 10:
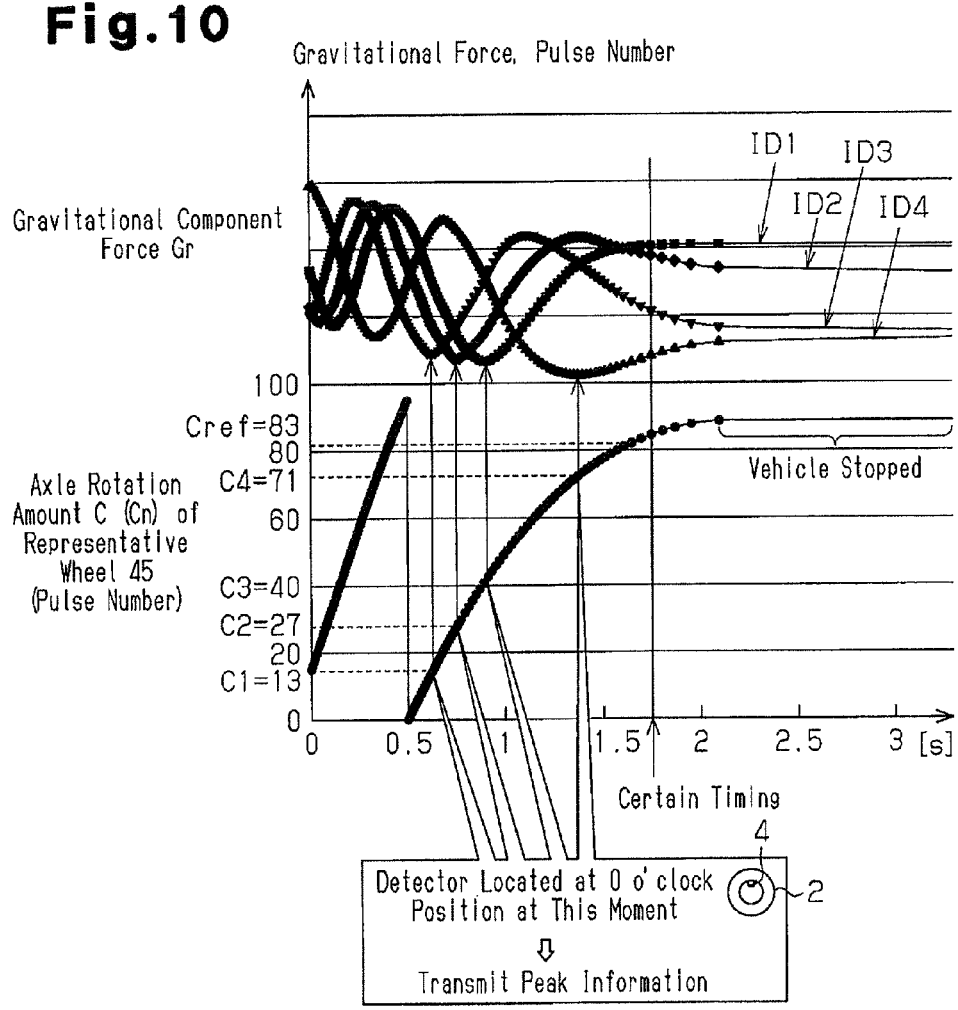
FIG. 10 is a waveform chart showing changes in the axle rotation amount and the gravitational component force.

FIG. 10 is a waveform diagram of the axle rotation amount and the gravitational component force. The detector angle calculator 44 acquires the axle rotation amount Cn (n=1 to 4) of the representative wheel 45 when the gravitational component force Gr reaches the peak (12 o'clock position). For example, when ID3 (e.g., right rear tire pressure detector 4c) is located at the 12 o'clock position, the axle rotation amount C1 of the representative wheel 45 is "13." When ID2 (e.g., left front tire pressure detector 4b) is located at the 12 o'clock position, the axle rotation amount C2 of the representative wheel 45 is "27." When ID1 (e.g., right front tire pressure detector 4a) is located at the 12 o'clock position, the axle rotation amount C1 of the representative wheel 45 is "40." When ID4 (e.g., left rear tire pressure detector 4d) is located at the 12 o'clock position, the axle rotation amount C4 of the representative wheel 45 is "71."

If the axle rotation amounts C1 to C4 are all acquired when the tire pressure detectors 4a to 4d are all located at the 12 o'clock position, the detector angle ek of each of the tire pressure detectors 4a to 4d is calculated at a certain timing, for example, when the axle rotation amount Cref of the representative wheel 45 reaches "83." The certain timing may be after a predetermined period elapses from when the axle rotation amounts C1 to C4 of all four wheels are acquired or may be the moment the axle rotation amount Cn for the final one of the four wheels is obtained.

Figure 11:
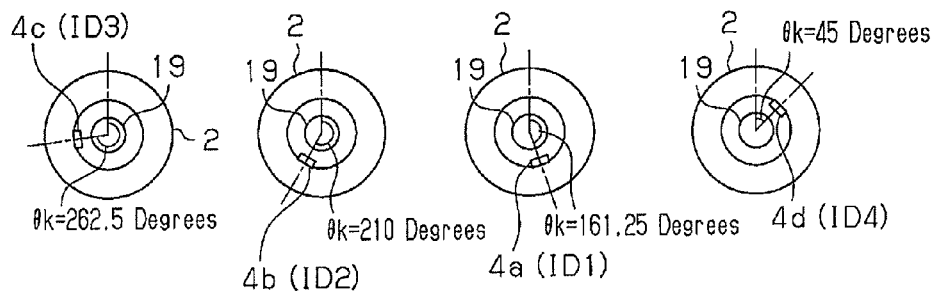
FIG. 11 is a diagram showing the angle of each tire pressure detector.

Referring to FIG. 11, the detection angle ek of each of the tire pressure detectors 4a to 4d is an angle advanced by a predetermined number of pulses from the 12 o'clock position. When the pulse is "83" for the representative wheel 45, the certain determination timing for ID3 is 262.5 degrees (=(83−13)×360/96) using the 12 o'clock position as a reference (0 degrees). The certain determination timing for ID2 is 210 degrees (=(83−27)×360/96) using the 12 o'clock position as a reference (0 degrees). The certain determination timing for ID1 is 161.25 degrees (=(83−40)×360/96) using the 12 o'clock position as a reference (0 degrees). The certain determination timing for ID4 is 45 degrees (=(83−71)×360/96) using the 12 o'clock position as a reference (0 degrees).

When the detector angle θk is calculated in each of the tire pressure detectors 4a to 4d for the four wheels, the combined information calculator 34 reads the axle rotation amount C of each of the axle rotation amount detectors 32a to 32d the moment the angle calculation is completed and then calculates the set of the detector angle $\theta k$ and the axle rotation amount C for each wheel as the combined information Dk. The combined information calculator 34 calculates the combined information Dk whenever new peak information Spk for the four wheels is received and the detector angle $\theta k$ is calculated. When the ignition switch 18 goes OFF, the combined information storage 35 stores the combined information Dk acquired immediately before the ignition switch 18 goes OFF (may be the moment the ignition switch 18 goes OFF) in the memory 15.

It is assumed here that the ignition switch 18 goes ON again and the vehicle 1 starts to move. When the vehicle 1 moves, the operation control unit 22 compares the combined information Dk first calculated after the vehicle 1 starts to move with expected values obtained from the combined information stored in the memory 15 to determine whether or not the mounting positions of the tires 2 have been changed. When the combined information Dk is in conformance, the operation control unit 22 determines that the mounting positions of the tires 2 have not been changed. Otherwise, the operation control unit 22 determines that the mounting positions of the tires 2 have been changed.

In addition to advantages (1) to (11) of the above embodiment, the present embodiment has the advantages described below.

(12) In the determination of the present example, the detector angle $\theta k$ may accurately be calculated even when the gravitational force Gr detected by the acceleration sensor 10 includes an error caused by the temperature, an error caused by the centrifugal force during tire rotation, or the like. Thus, tire positions changes may be accurately determined.

(13) The determination of whether or not the mounting positions of the tires 2 have been changed is performed when the vehicle 1 is moving at a low velocity. This avoids interference between the peak information Spk transmitted from each of the tire pressure detectors 4a to 4d. Thus, the determination of whether or not the tire mounting positions have been changed may be completed within a short period of time.

(14) The vehicle 1 does not have to be stopped to determine changes in the tire mounting positions. Thus, the detector angle $\theta k$ may be obtained at the desired timing under a low velocity.

It should be apparent to those skilled in the art that the present invention may be embodied in many other specific forms without departing from the spirit or scope of the invention. Particularly, it should be understood that the present invention may be embodied in the following forms.

In each of the above embodiments, the tire pressure detector 4 may transmit the tire pressure signal Stp, for example, when the acceleration sensor 10 detects that the rotation of the corresponding tire 2 has stopped.

In each of the above embodiments, the tire pressure detector 4 does not necessarily have to include the detected gravitational component force Gr in the tire pressure signal Stp. For example, the tire pressure detector 4 may solely transmit the gravitational component force Gr.

In each of the above embodiments, the tire position may be determined by, for example, specifying the position of the tire pressure detector 4 from a received signal strength indicator when the TPMS receiver 12 receives the tire pressure signal Stp.

In each of the above embodiments, the gravitational component force Gr1 acquired when the ignition goes OFF may be, for example, data collected immediately before the ignition switch 18 goes OFF.

In each of the above embodiments, the acceleration sensor 10 may be of a two-axis detection type that detects a component force orthogonal to the gravitational component force Gr in addition to the gravitational component force Gr in the direction of the axle.

In each of the above embodiments, the state of the ignition switch 18 may be determined by a signal received from another member such as a body that manages the power for electric devices. Instead of an ignition signal, any signal may be used as long as the signal allows for determination that the engine is stopped. For example, the gravitational component force acquisition unit 20 acquires the gravitational component force Gr1 for each of the four tires 2a to 2d when the drive source of the vehicle 1 is stopped and when the drive source of the vehicle 1 is started.

In each of the above embodiments, the determination for changing the mounting positions of the tires 2 does not have to be performed for all of the four tires 2a to 2d and may be performed on at least one wheel.

In the second and third embodiments, the actually measured combined information Dk and the expected values do not have to be completely in conformance and a certain amount of error may be allowed.

In each of the above embodiments, the radio waves transmitted from the tire pressure detector 4 when the vehicle 1 starts to travel is not limited to the tire pressure signal Stp and may be, for example, radio waves exclusively dedicated for tire position change determination. The signal includes at least the gravitational component force data and the tire ID.

In each of the above embodiments, the acceleration sensor 10 is not limited to a sensor that detects the gravitation component force Gr in the direction of the axle. The acceleration sensor 10 may be a sensor that detects gravitational component force only in a direction orthogonal to the direction of the axle or a two-axis sensor that detects gravitational component force in the axle direction and the orthogonal direction.

In each of the above embodiments, the gravitational component force may be a component force in a direction orthogonal to the axle direction.

In each of the above embodiments, the gravitational component force detection unit is not limited to the acceleration sensor 10 and may be any sensor that detects the gravitational force generated at the tire pressure detector 4.

In each of the above embodiments, the axle rotation amount detector does not have to be an ABS sensor and may be any sensor that may detect the rotation amount of the axle 31.

In each of the above embodiments, the determination of whether or not the vehicle 1 has stopped may be based on, for example, vehicle velocity data output from a meter ECU or the like.

In each of the above embodiments, the tire position change determination may include a spare tire.

In each of the above embodiments, the determination of the previous coupling positions does not have to be performed when the vehicle 1 is stopped or parked and may be performed when, for example, the vehicle 1 is travelling slow enough as to be regarded as being stopped.

In each of the above embodiments, the automatic locating (e.g., calculation of the detector angle Ok) may be performed in any manner using the gravitational component force.

The present examples and embodiments are to be considered as illustrative and not restrictive, and the invention is not to be limited to the details given herein, but may be modified within the scope and equivalence of the appended claims.

The invention claimed is:

1. A tire position determination system arranged in a vehicle including a direct type tire pressure monitoring unit, the tire position determination system comprising:
   a tire pressure detector coupled to a tire;
   a tire position determination unit that locates the tire pressure detector and determines a mounting position of the tire;
   a gravitational component force detection unit arranged in the tire pressure detector, wherein the gravitational component force detects gravitational force applied to the tire pressure detector and generates gravitational force information based on the detected gravitational force;
   a characteristic value acquisition unit that acquires a characteristic value corresponding to an angle of the tire pressure detector based on the gravitational force information generated by the gravitational component force detection unit, wherein the characteristic value acquisition unit acquires a first characteristic value of the tire pressure detector when a drive source of the vehicle is stopped, and the characteristic value acquisition unit acquires a second characteristic value of the tire pressure detector when the drive source of the vehicle is started;
   a characteristic value comparator that compares the first characteristic value and the second characteristic value; and
   an operation control unit that determines whether the mounting position of the tire has been changed based on the comparison of the characteristic value comparator, wherein the operation control unit controls the tire pressure monitoring unit based on the determination.

2. The tire position determination system according to claim 1, wherein
   the tire pressure detector is one of a plurality of tire pressure detectors respectively coupled to a plurality of tires, and
   the characteristic value acquisition unit acquires a characteristic value based on the angle of each of the tire pressure detectors.

3. The tire position determination system according to claim 2, wherein the characteristic value acquisition unit uses an axle rotation amount of a representative wheel when the characteristic value is acquired and an axle rotation amount of the representative wheel at a certain timing to acquire a rotational angle of each of the tire pressure detectors as the characteristic value.

4. The tire position determination system according to claim 1, wherein when determining that the mounting position of the tire has not been changed, the operation control unit shows the mounting position of the tire acquired in the previous determination on a display of the tire pressure monitoring unit.

5. The tire position determination system according to claim 1, wherein when determining that the mounting position of the tire has been changed, the operation control unit indicates that the mounting position of the tire has been changed on a display of the tire pressure monitoring unit.

6. The tire position determination system according to claim 1, wherein when determining that the mounting position of the tire has been changed, the operation control unit has the tire position determine unit determine the mounting position of the tire again.

7. The tire position determination system according to claim 1, wherein
   after the tire position determination unit determines that the mounting position of the tire has not been changed, the tire position determination unit determines the mounting portion of the tire in fixed cycles or irregular cycles; and
   when the tire position determination unit determines that the mounting position of the tire has been changed, the tire position determination unit reregisters the mounting position of the tire and updates information of the mounting position shown on a display of the tire pressure monitoring unit.

8. The tire position determination system according to claim 1, wherein
   the tire pressure detector constantly or periodically transmits the gravitational force information regardless of whether the drive source is stopped or operating;
   the characteristic value acquisition unit receives the gravitational information from the tire pressure detector to acquire the gravitational information when the drive source is stopped.

9. The tire position determination system according to claim 1, further comprising:
   an axle rotation amount detector that detects a rotation amount of an axle;
   a rotation amount acquisition unit that acquires a rotation amount of the axle from the detection of the axle rotation amount detector;
   a combined information calculator that calculates combined information of the axle rotation amount and the characteristic value, which are acquired when the drive source of the vehicle is stopped;
   an information storage that stores the combined information generated by the combined information calculator; and
   an expected value computer that computes expected values of the axle rotation amount and the characteristic value acquired when the tire rotates based on the combined information;
   wherein the characteristic value comparator compares the expected values with the axle rotation amount and the characteristic value that are acquired after the drive source of the vehicle is started to determine whether or not the coupling position of the tire has been changed.

10. The tire position determination system according to claim 9, wherein the operation control unit determines whether or not the mounting position of the tire has been changed when the characteristic value is first calculated after the drive source of the vehicle is started.

11. The tire position determination system according to claim 9, wherein the operation control unit determines whether or not the mounting position of the tire has been changed when first receiving radio waves transmitted from the tire pressure detector after the drive source of the vehicle is started.

12. The tire position determination system according to claim 9, wherein the information storage stores a combination of the axle rotation amount and the characteristic value in response to a drive source stop signal immediately before the drive source of the vehicle is stopped.

13. The tire position determination system according to claim 9, wherein
   the combined information calculator acquires the axle rotation speed and the characteristic value for a number of times in response to a drive source stop signal immediately before the drive source of the vehicle is stopped, and
   the information storage acquires a set of the combined information immediately before the drive source of the vehicle stops based on multiple combinations of the axle rotation amount and the characteristic value.

14. The tire position determination system according to claim 1, wherein the characteristic value corresponding to a rotational angle of the tire pressure detector includes a gravitational component force.

* * * * *